United States Patent
Yokota et al.

(10) Patent No.: US 6,463,372 B1
(45) Date of Patent: Oct. 8, 2002

(54) VEHICLE COLLISION DAMAGE REDUCTION SYSTEM

(75) Inventors: Keishi Yokota; Hiroaki Fujii; Tadayuki Ato; Eiji Yanagi; Hiroshi Aoki, all of Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/633,142

(22) Filed: Aug. 4, 2000

Related U.S. Application Data

(60) Provisional application No. 60/147,135, filed on Aug. 4, 1999, provisional application No. 60/147,150, filed on Aug. 4, 1999, provisional application No. 60/147,137, filed on Aug. 4, 1999, provisional application No. 60/147,138, filed on Aug. 4, 1999, and provisional application No. 60/147,136, filed on Aug. 4, 1999.

(51) Int. Cl.[7] .......................... B60R 22/48; B60R 22/46
(52) U.S. Cl. ...................................... 701/45; 280/801.1
(58) Field of Search .................. 701/45; 307/10.1; 280/735, 801.1; 342/72

(56) References Cited

U.S. PATENT DOCUMENTS

| | | | | |
|---|---|---|---|---|
| 3,860,923 A | * | 1/1975 | Yamanaka et al. | 343/7 ED |
| 5,451,094 A | * | 9/1995 | Templin et al. | 296/68.1 |
| 5,558,370 A | * | 9/1996 | Behr | 280/806 |
| 5,585,798 A | * | 12/1996 | Yoshioka et al. | 342/70 |
| 5,825,098 A | * | 10/1998 | Darby et al. | 307/10.1 |
| 6,014,601 A | * | 1/2000 | Gustafson | 701/45 |
| 6,123,357 A | * | 9/2000 | Hosoda et al. | 280/730.2 |
| 6,186,537 B1 | * | 2/2001 | Breed et al. | 280/735 |
| 6,256,565 B1 | | 7/2001 | Yanagi et al. | 701/45 |
| 6,278,360 B1 | | 8/2001 | Yanagi et al. | 340/436 |

FOREIGN PATENT DOCUMENTS

| | | |
|---|---|---|
| JP | 09-123942 | 5/1997 |
| JP | 9-132113 | 5/1997 |
| JP | 09-183331 | 7/1997 |
| JP | 2000225921 | 8/2000 |
| JP | 2001-039269 | 2/2001 |

* cited by examiner

*Primary Examiner*—Michael J. Zanelli
(74) *Attorney, Agent, or Firm*—Foley & Lardner

(57) ABSTRACT

A vehicle collision damage reduction system is provided. The system works by detecting the relative speed between the vehicle and an object, such as another vehicle. A danger level is calculated based on parameters such as speed and distance to the object; the danger level could be at an "emergency level" or at some lower level. Based on the danger level, different corrective measures and the degree of the corrective measures can be adjusted to attempt to minimize occupant injury. For example, the airbag can be adjusted to better protect the occupant, a pre-tensioner can be activated at a certain level, and the inclination of a child restraint seat may be adjusted as well.

20 Claims, 13 Drawing Sheets

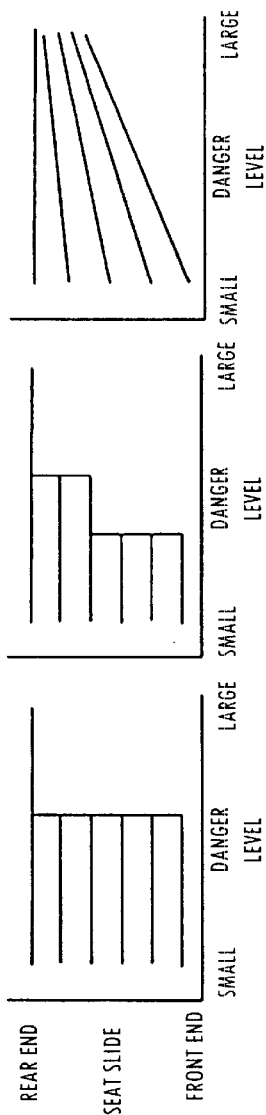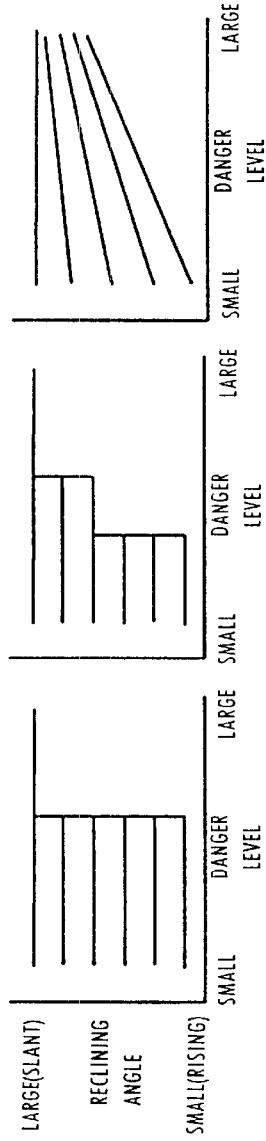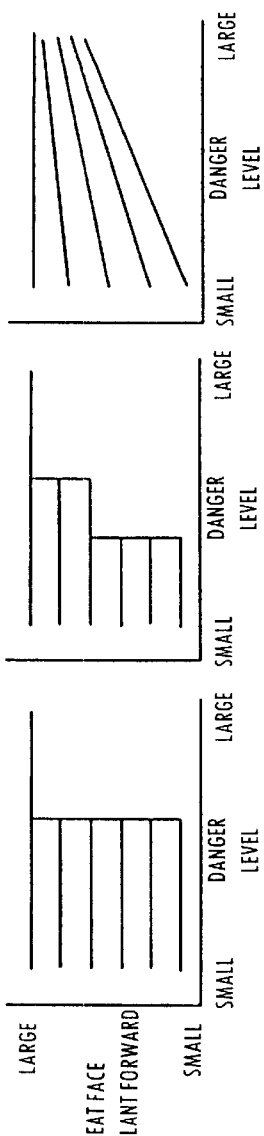

VEHICLE COLLISION DAMAGE REDUCTION SYSTEM

This application claims priority of U.S. Provisional Application Nos. 60/147,135, 60/147,150, 60/147,137, 60/147,138, 601147,136, all filed Aug. 4, 1999.

BACKGROUND OF THE INVENTION

1. Field of the Invention

The present invention relates to a vehicle collision damage reduction system, and more specifically, it relates to a system for minimizing injury to the occupant suffered in a vehicle collision. This system works to detect an unavoidable collision during vehicle travel just prior to the collision and to deform the vehicle's structure in the collision, thus absorbing enough collision energy to ensure adequate safety space for the occupant and to enable occupant restraint protection devices to operate effectively.

2. Description of the Related Art

Various vehicle structures and occupant protective devices have been previously developed to attempt to reduce injury to occupants in a vehicle collision. The features of and problems in conventional vehicle structures and occupant protective restraining devices generally will be described below.

Vehicle Structure for Damage Reduction in Collision

To achieve reduction in occupant injury in a collision, it is first important that a safety space for an occupant be secured in the vehicle structure and that the impact applied to the occupant be reduced in a vehicle collision and in a secondary collision.

Vehicle Structure

A conventional vehicle structure of a passenger vehicle can be designed keeping in mind several assumptions regarding various collision conditions for occupant safety. In general, a crushable zone is provided in the front and rear of a vehicle structure so as to absorb impact reliably in a collision while the structural rigidity of the cabin portion as a safety space is increased for the safety of the occupants. For example, in a head-on collision, front members such as front cross members, side members, and vehicle frames are designed to be crushed in sequence to receive collision energy and thereby absorb the energy so as to minimize the deformation and rupture of the cabin portion.

However, when the collision speed is higher than the assumed value for designing members of various parts and the vehicle frame, the cabin can be greatly deformed so that an occupant restraint protective device in the cabin might be in danger of being injured and thereby not protecting the occupant properly against the applied collision energy. Also, impact energy absorption by the vehicle might be insufficient, depending on the form of the collision.

Steering Mechanism for Impact Absorption

In certain known steering mechanisms, an impact absorption mechanism may be included which undergoes displacement in the front direction when a predetermined load is applied thereto, Such steering mechanism may be assembled on the assumption that a steering wheel located in front of an occupant might be an element capable of injuring the occupant in a collision, e.g., the occupant's torso or other areas, when the occupant collides with the steering wheel in the secondary collision following after the initial vehicle collision. A collision "energy absorbing" structure (an "EA" structure) also may be assembled in an alignment device of the steering mechanism or within a column shaft so as to attempt to reduce injury.

Since EA load characteristics for this structures are designed at this time to assume that the occupant is of AM 50% (i.e., the standard size of adult male) colliding under a predetermined condition, these assumptions may be not the most suitable for occupants having various physiques and sitting in various states and for various collision states to best attempt to reduce occupant injury. A more variable system is needed.

Occupant Restraint Protective Devices for Reducing Injury in a Collision

As a typical example of an occupant restraint protective device, a seatbelt device, an airbag, and a child seat are known and becoming wide spread. However, they have the following undesirable characteristics:

In a conventional seating position, an occupant is free to assume different seating postures. The occupant even may have an unsuitable posture for securing him safely by a seatbelt or an airbag. For example, the following seating postures are not the best for providing adequate safety to the occupant:

(1) sitting excessively close to the steering wheel
(2) sitting with an excessively inclined seat back
(3) lower seat surface at the front than that at the rear.

It is preferable that the occupants having the posture be corrected to have proper posture and a proper position for being properly restrained.

In a conventional seatbelt take-up device with a pre-tensioner, the pre-tensioner is activated by determining a collision scale from the acceleration and the speed-change rate detected by a crush detecting sensor, etc. When a head-on collision of a vehicle occurs, for example, a difference of relative speed between an occupant and the vehicle occurs in a slight delay period just after the collision because of the inertia force applied to the occupant when the vehicle speed is zero. In order to drive the pre-tensioner of the seatbelt for restraining the occupant moving within such a slight time difference, a large driving force is needed. Therefore, in a conventional pre-tensioner, a strong and heavy driving source large in size is used, so that a miniaturized and lightweight seatbelt take-up device having the pre-tensioner assembled therein is difficult to be achieved.

Child Seat

In a conventional child seat (referred to as a "CRS" or "Child Restraint Seat"), because an infant is seated thereon in a collision, a restraining effect is changed in accordance with the installing state of the CRS and the reclining state. For example, when the CRS is installed forward-facing in an upright position in a collision, the impact applied to the infant is substantially restrained by buckle and belt portions. In contrast, in a reclining position, it is assumed that part of the restraining load applied to the belt can be relieved by the seat surface because the seat surface is formed to serve as a supporting face relative to the colliding direction.

On the other hand, when a collision occurs with the CRS installed rearward-facing in a reclining position, although an infant is supported by a seat back portion, the infant starts to slide in the collision direction because the inclination angle is small, so that the infant is restrained in the loaded state on a shoulder belt. However, when the CRS is in an upright position, it is assumed that the load is substantially supported by the seat back because of the large angle of inclination.

Improving Damage Reduction in Collision by Using a Collision Predicting Sensor System To attempt to overcome some of these problems, a collision safety system has been under development in which a collision is unavoidable by determining the distance between the vehicles and the acceleration state by using a non-contact distance sensor using, inter alia, radio waves (millimetric waves), a laser, ultrasonic waves, acoustic sound waves, visible light, or the like. In such a system, for example, an embodiment is considered in that the occupant restraint protective device starts to function just before a collision in accordance with an emergency level which is determined in stages by a collision danger level determining circuit arrangement in the system, which utilizes the above-mentioned non-contact distance sensor as a collision predicting sensor attached to the front end of an own vehicle for detecting a running speed of the own vehicle, a distance and a relative speed to another vehicle or an obstacle (object to be impacted), and so forth. Some of the applicants has developed a technique disclosed in Japanese Unexamined Patent Application Publication No. 9-132113 as a criterion of assessing various danger levels with respect to the severity of the impending collision, which is hereby incorporated herein its entirety. By utilizing such a developed technique, a more advanced damage reduction method from a collision is achieved.

SUMMARY OF THE INVENTION

As mentioned above, when a collision is detected just before the collision, the above-mentioned vehicle structure and the occupant restraining and protecting device respectively serve the following functions at a vehicle collision, thereby, injury reduction may be achieved.

Safety Vehicle Structure

When the collision speed is large, the energy absorbing capacity is increased corresponding to the speed. Besides a full-lap collision, even when an offset collision having a lapping rate of 50% or less occurs, the collision energy is efficiently absorbed by only the vehicle part on the collision side. "Lapping rate" means the amount which a vehicle collides with and overlaps an object or vehicle upon a collision.

Before a secondary collision occurs just after a vehicle collision, the capacity to absorb occupant collision energy is increased. For example, the distance between an occupant (driver) and the steering wheel is increased without sacrificing steering operability, thereby minimizing injury to the torso and/or the head of the occupant against the steering wheel during the collision. In order to reduce damage of occupants having various physiques and seated postures, the EA load characteristics are preferred to be capable of being varied.

Occupant Restraining and Protecting Device: Seat-adjusting Mechanism

When an occupant has an undesirable seating posture, the posture is desired to be properly corrected so that the occupant can be properly restrained and protected by the seatbelt device and the airbag. Thereby, even when an occupant has proper seating posture, the restraining function can be furthermore improved. When the object detecting means such as the collision predicting sensor is used in the correcting operation, sufficient operating time for the device can be secured and the correction can be performed by taking the collision danger level into consideration. In this way, the restraining and protecting means can function in a moderate mode of operation, depending on the situation, without always using a momentary, actuating high-power driving device.

Seatbelt Pre-tensioner

In order to drive the pre-tensioner of the seatbelt so as to restrain an occupant within a short time before the displacement of the occupant just after the collision, high-power driving force is required. However, when the object detecting means such as the collision predicting sensor is used in the correcting operation, sufficient operating time for the device can be secured and the correction can be performed by taking the collision danger level into consideration. In this way, the restraining and protecting means can function in a moderate mode of operation, depending on the situation, without always using a momentary actuating high-power driving device. Therefore, the pre-tensioner device can be miniaturized and also can provide very effective protection that restrains an occupant before the movement.

CRS Reclining Mechanism

When a collision occurs when a CRS is installed to the seat, the various reclining positions of the CRS can be corrected to have desired or optimum posture for minimizing collision injury, so that impact applied to an infant at the collision is dispersed over a more wider area in order to support the infant. When the object detecting means such as the collision predicting sensor is used in the correcting operation, sufficient operating time for the device can be secured and the correction can be performed by taking the collision danger level into consideration. In this way, the restraining and protecting means can function in a moderate mode of operation, without always using a momentary, actuating high-power driving device.

The above-mentioned functions may be achieved by the present invention.

In accordance with a first aspect of the present invention, there is provided a vehicle collision damage reduction system comprising at least one object detecting means for sequentially detecting distance information to an object to be impacted moving relatively, and collision danger level determining means for determining a collision danger level so as to output collision predicting information by sequentially detecting the distance information; collision energy absorbing means in a vehicle structure formed to support part of the vehicle structure in advance for absorbing collision energy applied thereto in a collision; and controlling means for outputting an operational command, before the collision, to the collision energy absorbing means in a vehicle structure on the basis of the collision predicting information obtained from the object detecting means or the collision danger level determining means.

Preferably, the collision energy absorbing means in a vehicle structure is introduced as part of the vehicle structure in advance of an airbag and formed to support part of the vehicle structure. The airbag can be inflated, before a collision, by an operational command from the controlling means and deforming so as to absorb the collision energy applied thereto when the vehicle structure deforms at the collision.

The expansion rate or the energy absorbing amount of the airbag for the vehicle structure may be preferably changed in stages in response to the collision danger level based on the collision predicting information obtained from the collision danger level determining means.

In accordance with a second aspect of the present invention, there is provided a vehicle collision damage reduction system comprising at least one object detecting means for sequentially detecting distance information to an object to be impacted moving relatively, and collision danger level determining means for determining a collision danger level so as to output collision predicting information by sequentially detecting the distance information; collision energy absorbing means for a vehicle occupant for absorbing collision energy applied to an occupant in a secondary collision following a vehicle collision; and controlling means for outputting an operational command, before the collision, to the collision energy absorbing means for a vehicle occupant on the basis of the collision predicting information obtained from the object detecting means or the collision danger level determining means.

The collision energy absorbing means for a vehicle occupant may be preferably steering column shortening means introduced in part of a steering column or a shaft to be shortened in the axial direction, before a collision, by an operational command from the controlling means, so as to increase the distance between the occupant and the steering column or a shaft.

Load characteristics of the collision energy absorbing means for a vehicle occupant introduced in part of a steering column or a shaft may also be preferably changed in stages in response to the collision danger level of the collision predicting information obtained from the collision danger level determining means.

Preferably, a vehicle collision damage reduction system further comprises occupant seating information detecting means for detecting physique and a seating state of an occupant seated in a seat so as to output seating state information to the controlling means, wherein the operational amount of the collision energy absorbing means for a vehicle occupant is established, before a collision, on the basis of the seating state information obtained by the occupant seating information detecting means. The "seating state" is defined as the condition how the occupant is seated in a seat, such as how close to the steering wheel, how far the seat back is inclined, etc.

In accordance with a third aspect of the present invention, there is provided a vehicle collision damage reduction system comprising at least one object detecting means for sequentially detecting distance information to an object to be impacted moving relatively and collision danger level determining means for determining a collision danger level so as to output collision predicting information by sequentially detecting the distance information; a seat adjusting mechanism capable of adjusting seat sliding, reclining, and seat height of a seat independently or simultaneously; controlling means for outputting an operational command of a predetermined seat adjustment amount to the seat adjusting mechanism on the basis of the collision predicting information obtained from the object detecting means or the collision danger level determining means; and occupant seating information detecting means for detecting physique and a seating state of an occupant seated in a seat so as to output the seating information to the controlling means.

Preferably, the seat adjustment amount of the seat adjusting mechanism is changed in stages, before a collision, in response to the danger level of the collision predicting information obtained from the collision danger level determining means.

Preferably, the seat adjustment amount of the seat adjusting mechanism is established, before a collision, on the basis of the seating information obtained from the occupant seating information detecting means for detecting physique and a seating state of an occupant seated in a seat.

In accordance with a fourth aspect of the present invention, there is provided a vehicle collision damage reduction system comprising at least one of object detecting means for sequentially detecting distance information to an object to be impacted moving relatively, and collision danger level determining means for determining collision danger level so as to output collision predicting information by sequentially detecting the distance information; a seatbelt pre-tensioner for a seatbelt take-up device of a seat; controlling means for outputting an operational command of webbing retraction in a predetermined amount to the seatbelt pre-tensioner on the basis of the collision predicting information obtained from the object detecting means or the collision danger level determining means; and occupant seating information detecting means for detecting physique and a seating state of an occupant seated in a seat so as to output the seating information to the controlling means.

At this time, it is preferable that the webbing take-up amount of the seatbelt pre-tensioner be changed in stages, before a collision, in response to the danger level of the collision predicting information obtained, from the collision danger level determining means.

The webbing retracting amount of the seatbelt pre-tensioner may also be more optimally established, before a collision, on the basis of the seating information obtained from the occupant seating information detecting means for detecting physique and a seating state of an occupant seated in a seat.

In accordance with a fifth aspect of the present invention, there is provided a vehicle collision damage reduction system comprising at least one object detecting means for sequentially detecting distance information to an object to be impacted moving relatively, and collision danger level determining means for determining collision danger level so as to output collision predicting information by sequentially detecting the distance information; a child seat installed to a seat in a predetermined installing state and having a reclining angle to be adjustable independently or simultaneously; controlling means for outputting an operational command of a predetermined adjustment amount of the reclining angle to the child seat on the basis of the collision predicting information obtained from the object detecting means or the collision danger level determining means; and occupant seating information detecting means for detecting the child seat installed to a seat so as to output the installing information to the controlling means.

At this time, it is preferable that the adjustment amount of the reclining angle of the child seat be changed in stages, before a collision, in response to the danger level of the collision predicting information obtained from the collision danger level determining means.

The adjustment amount of the reclining angle of the child seat may also be preferably established, before a collision, on the basis of the seating information of the child seat obtained from the occupant seating information detecting means for outputting the installing information of the child seat to the controlling means.

BRIEF DESCRIPTION OF THE DRAWINGS

FIGS. 10a to 10c are characteristic charts of the corrective states set in the seat adjusting mechanism.

DETAILED DESCRIPTION OF THE PREFERRED EMBODIMENT

An embodiment of a vehicle collision damage reduction system according to the present invention will be described below with reference to the attached drawings.

Figure 1:
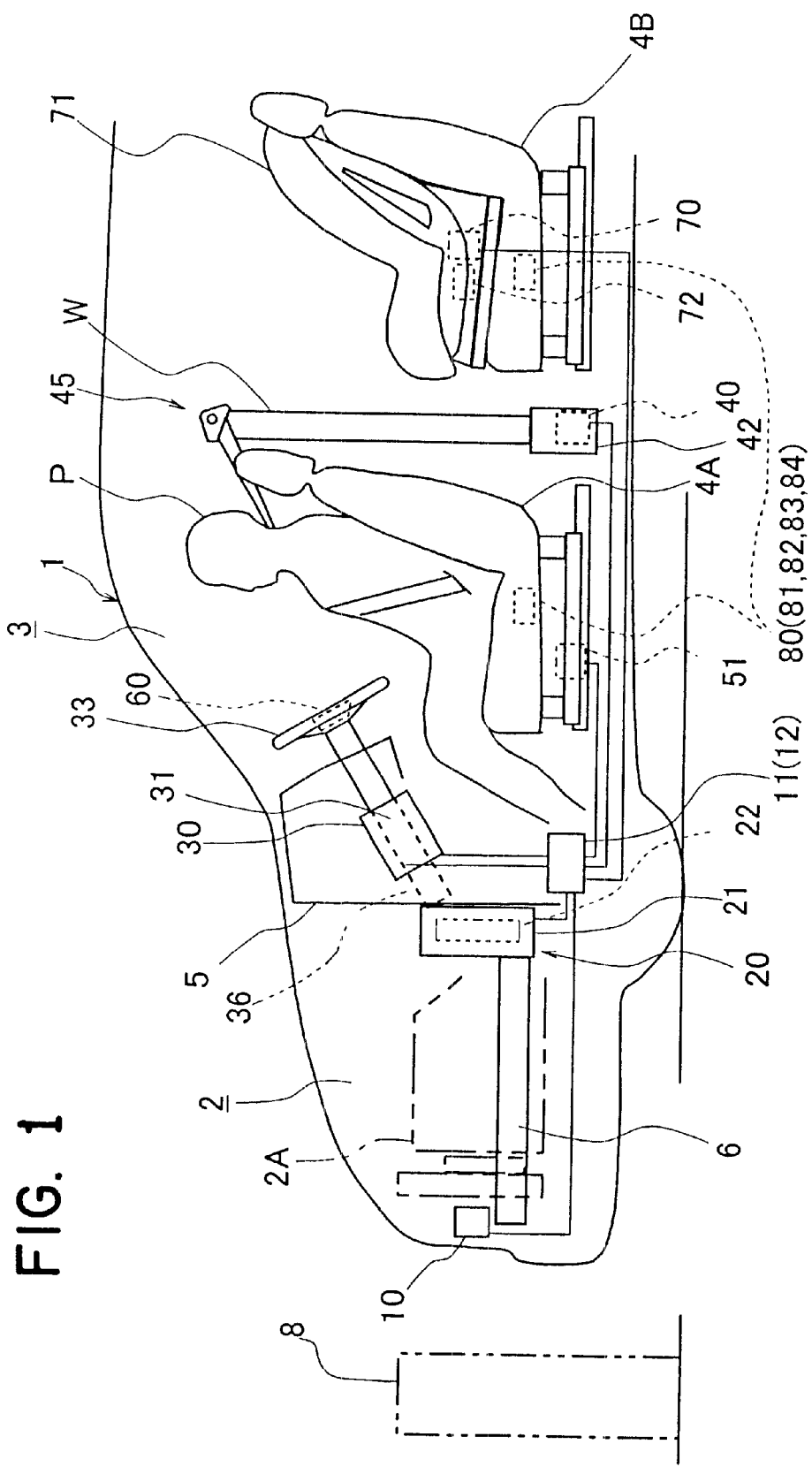
FIG. 1 is a system diagram showing an embodiment of a vehicle collision damage reduction system.

FIG. 1 is a perspective system diagram showing a perspective structure of a vehicle collision damage reduction system according to the present invention, which is introduced to a passenger vehicle. A safety vehicle structure and a structure of occupant restraining and protecting means as the vehicle collision damage reduction system will be described below.

As shown in FIG. 1, in the front face of a vehicle 1, a non-contact distance sensor is provided as an object detecting means. This non-contact distance sensor uses radio waves (millimetric waves), a laser, ultrasonic waves, acoustic sound waves, infrared rays, visible light, or the like. In particular, a distance sensor utilizing radar by millimetric waves is difficult to be affected in measuring by external perturbations in comparison with other signal waves to thereby obtain measured data with high accuracy constantly. The distance data from the object detecting means 10 are input into controlling means 11 (referred to as an ECU 11 below, ECU: Electrical Control Unit), which is installed in part of the cabin where it is typically little affected by a collision. The ECU 11 is formed of a known processing circuit as a hardware structure and performs signal processing of a predetermined input signal so as to output a predetermined operational command to each of driving means. The ECU 11 also serves as a collision danger level determining means, which will be described later, so as to determine the danger level by signal processing of a predetermined detected signal. At a predetermined position of the vehicle 1, a body airbag 20, a steering column shortening means 30, an EA load characteristics changing means 36, which is a column energy absorbing means, are provided as vehicle safety structures. Within the cabin 3, a seatbelt device 45 and an occupant airbag 60 are provided as occupant restraining and protecting means for protecting an occupant "P" while on a rear seat "4B", a CRS 71 is installed. In addition, a seatbelt for fixing the CRS 71 is included but is not shown in each of the drawings.

Figure 2:
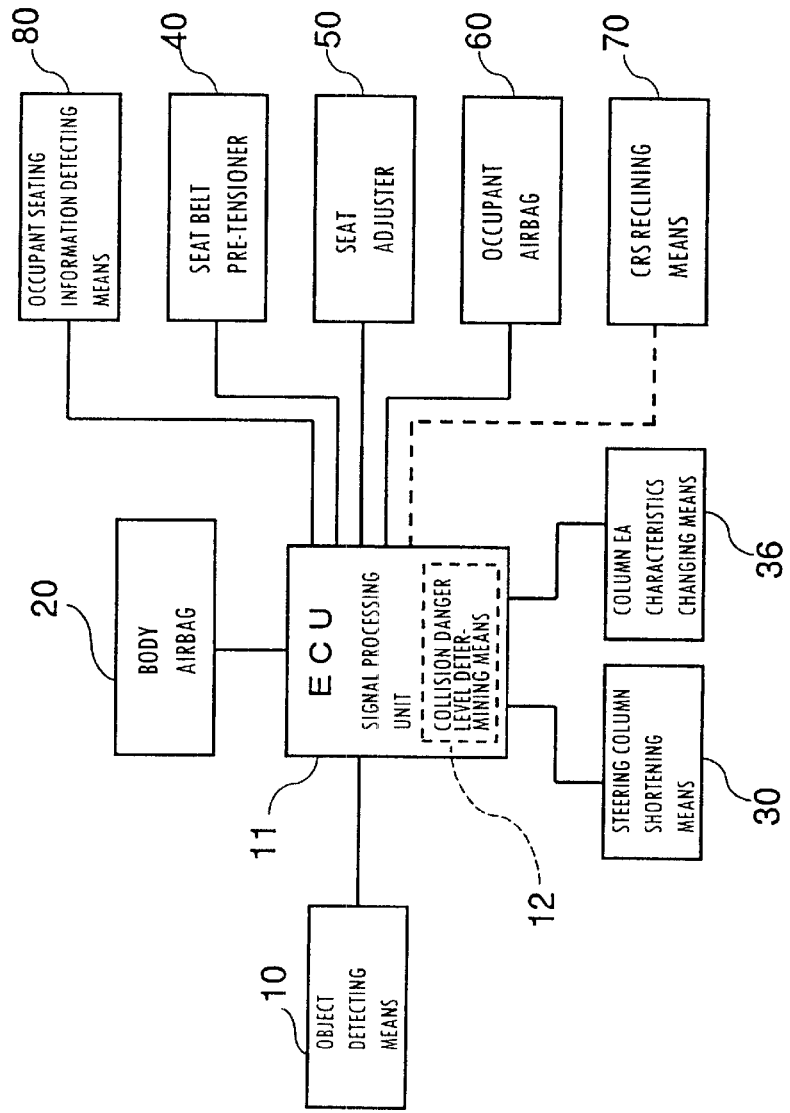
FIG. 2 is a block diagram showing a system structure having one body airbag in the vehicle collision damage reduction system shown in FIG. 1.

FIG. 2 is a block diagram showing this entire system structured by concentrating on the ECU 11 shown in FIG. 1. As is shown together in FIGS. 1 and 2, each driving means of the body airbag 20 functions as the safety vehicle structure, the steering column shortening means 30 functions as an occupant collision energy absorbing means, the EA load characteristics changing means 36 that is the column energy absorbing means, a seatbelt pre-tensioner 40 functions as the occupant restraining and protecting means, a seat adjusting mechanism 50, an occupant airbag 60, and a reclining mechanism 70 of the CRS 71 are connected to the ECU 11 that is a controlling means as hardware in this system in order to receive an operational command.

In addition, as shown in FIG. 1, the pre-tensioner 40 is built in a conventional seatbelt take-up device 42. Also, plural driving portions (not shown) are provided within a seat 4 for the seat adjusting mechanism 50. Furthermore, the reclining mechanism 70 of the CRS 71 is introduced to the CRS 71 installed to a seat surface and is to be operative when a weight sensor 81 as occupant seating information detecting means 80 and driving means 72 provided in the CRS 71 are connected to each other by signals.

In the seat 4 (referred to as numeral 4 when the front and rear seats are not distinguished) and the cabin 3, occupant detecting sensors (will be described later) are provided as various occupant seating information detecting means 80. A detecting signal from each of these sensors is sent to the ECU 11 as an output-signal informing of occupant-seating information. The occupant seating information detecting means 80 comprises various sensors for detecting the seating state of an occupant so as to obtain information for properly operating each of the occupant restraining and protecting means in response to the seating state. For example, a weight sensor 81, a seat-sliding sensor 82, a reclining angle detecting sensor 83, and a seat-face inclination detecting sensor 84, are built into the seat 4. Detected signals from these sensors are processed by computations in a signal processing unit of the ECU 11 thereby to establish the required correcting amount (sliding amount, angular amount, etc.) and the restraining amount based on the computation results so as to output a command to each of the restraining and protecting means.

Each structure and function of the safety vehicle structure, the occupant collision energy absorbing means, and the occupant restraining and protecting means will be described with reference to the attached drawings.

Figure 4:
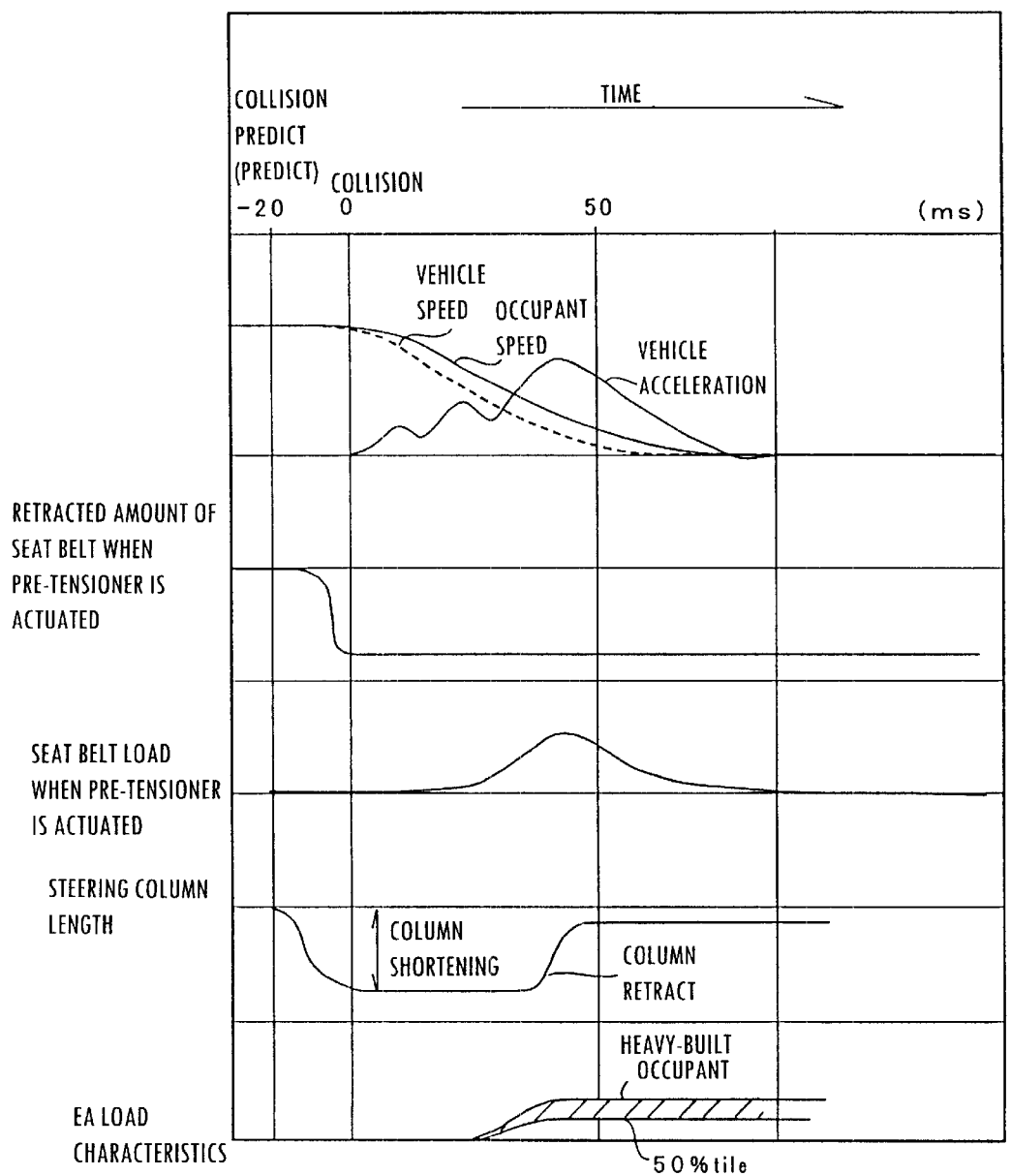
FIG. 4 is a graphical representation showing changes in the operational state of a safety vehicle structure and an occupant restraining and protecting device in the vehicle collision damage reduction system according to the present invention.

FIG. 4 is a graphical representation showing changes with the passage of time in operational quantities and characteristics such as operational timing and a load when each part operates during the time from the collision predicting stage until after the collision.

Establishment of Collision Predicting Level by the Collision Danger Level Determining Means The degree of collision danger is determined based on the distance information obtained from the object detecting means 10 in the ECU 11 functioning as the collision danger level determining means 12. In order to reduce collision damage, for example, when an "emergency level" is determined from the collision predicting information, it is important that the injury generated in a collision be minimized. As shown in FIG. 1, when a relative speed between the vehicle 1 and an object to be impacted 8 (depending on running conditions, the object can be either a vehicle running in the opposite direction, a following vehicle, or a stationary object) is determined. When the value reaches more than a predetermined value, this means that both will probably collide with each other without avoiding the collision. If the collision scale can be predicted before the collision so as to output a signal for securely operating the safety vehicle structure and the occupant restraining and protecting means in response to these conditions, the occupant "P" can be securely restrained and protected by such a structure and by means which are driven with a small driving force, not with a high-output driving device, in the collision. Large energy absorbing capacity of the vehicle 1 can also be achieved.

When the relative speed between the vehicle 1 and the object to be impacted 8 is large (for example, more than 20 Km/h) while the distance to the object to be impacted is too small to avoid a collision (for example, not more than 2 m), which is an example of the above-mentioned "emergency level", a great probability of a collision is considered. These determinations are performed in the collision danger level determining means 12, which is the signal processing unit of the ECU 11 as hardware, by computation of the signal from the object detecting means 10. The determined danger level as a result of the computation is applied to any one of plural levels in stages so as to output commands of operational amount and operational timing in response to the level.

Safety Vehicle Structure: Body Airbag

The structure and function of the body airbag 20 as vehicle structure collision energy absorbing means will be described with reference to FIGS. 5 and 6. In this embodiment, the body airbag 20 is described as an airbag provided in an engine room side of a partition wall 5 dividing the front engine room 2 and the cabin 3 of the vehicle 1. The body airbag 20 is introduced into part of the vehicle structure in advance and functions to absorb the impact energy applied to the vehicle 1 substantially at a head-on collision by employing when the collision is predicted in advance so as to support part of the deforming vehicle.

The body airbag 20 is provided in the engine room 2 side of the partition wall 5 dividing the cabin 3 and the front engine room 2 which functions as a crushable zone of the front of the vehicle 1, and mounted to part of a side member 6b in the partition wall 5 side. As shown in FIG. 6b, the body airbag 20 is accommodated in an expandable telescopic case 21, which is fixed to part of the front face of the partition wall 5.

A bag body 22 of the body airbag 20 is a balloon-bag-shaped body sewn of cloth-made base fabric and connected to gas generating means (not shown), the bag body 22 being inflatable by gas from the gas generating means. The bag body 22 functions to increase the volume of the case 21 by deploying within the case 21, in which it is accommodated. The gas generating means is capable of generating gas at higher pressure compared with that of the occupant airbag. Since the inflated body airbag 20 is not brought into contact with an occupant, not like the occupant airbag, parts for protecting the occupant safely, such as a filter in the gas generating means, can be omitted. As a structure of the bag body 22, a resisting pressure bag formed of thick rubber base fabric with reinforcing metallic mesh laminated thereon in layer may be used without accommodating in a predetermined case. Furthermore, an expanding (elongating) structure, in which a metallic or resin case having a cloth or rubber airtight bellows provided in part of the case is supplied by gas so that the bellows is elongated, can be included in the concept of the airbag according to the present invention.

The operation of the body airbag 20 will be described with reference to FIGS. 5 and 6. When an obstacle is positioned so as to decrease the relative distance to a vehicle running at the velocity "Vv" exists ahead of the vehicle, if the relative velocity "Vr" between them is more than 20 km/h, for example, while the distance "D" is a collision-unavoidable distance, for example, not more than 2 m (about 20 ms before the collision is assumed), the ECU 11 outputs an operational signal to deploy the body airbag 20 to an inflator as the gas generating means of the body airbag 20, on basis of an information signal obtained from a collision predicting sensor as the object detecting means 10. The body airbag 20 is inflated by the gas supplied by the inflator based on the operational signal, so that the volume of the case 21, in which the body airbag 20 is accommodated, is increased, as shown in FIGS. 5b and 6b. As to the operational timing, the expansion starts at about 10 ms before the collision and continues for about 20 ms after the collision. Therefore, when the body airbag 20 is completely deployed, as shown in FIGS. 5c and 6c, collision energy is absorbed by elastic deformation of the case 21 and deformation of the bag body 22 when parts such as an engine 2A and a transmission part move rearward in the process of the crushing of the front crushable zone of the vehicle 1 after the collision. Thereby, efficiency in deformation of the crushable zone is largely improved compared with that of a conventional vehicle structure, so that deformation of the cabin 3 and impact applied to an occupant "P" inside can be substantially reduced (see FIG. 5c).

Figure 5A:
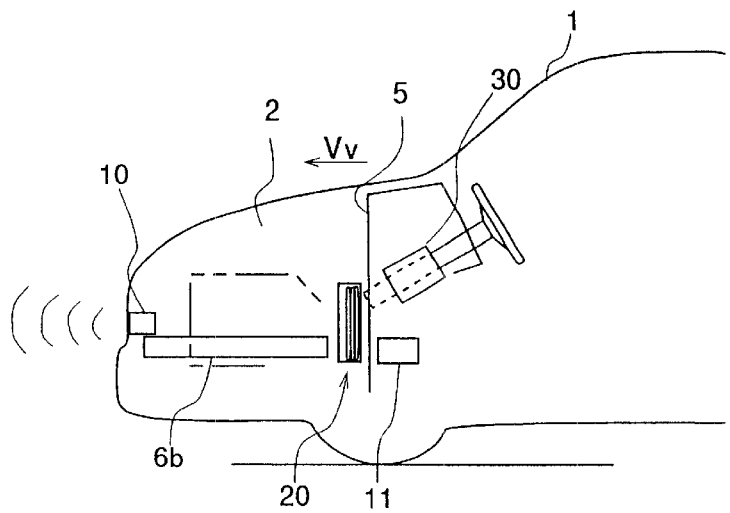
FIGS. 5a to 5c are representations schematically showing operational states of the safety vehicle structure in a collision (a body airbag, steering column shortening means, and a steering column EA mechanism) in the vehicle collision damage reduction system shown in FIG. 1.
Figure 5B:
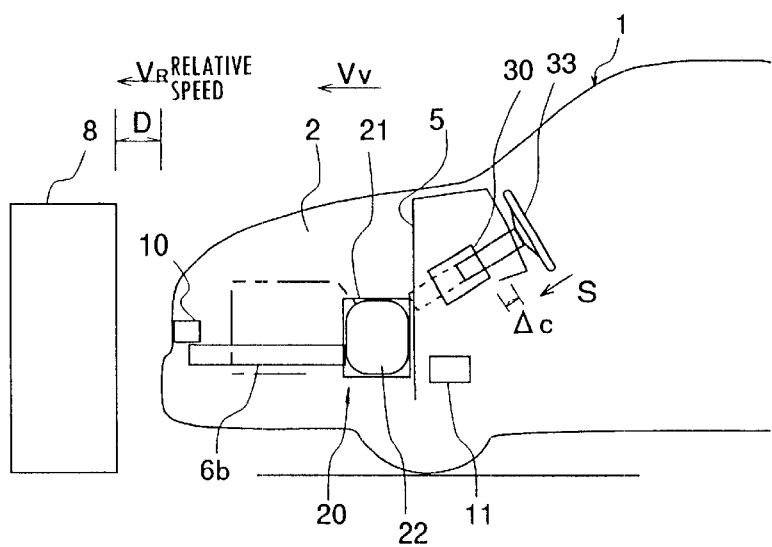
Figure 5C:
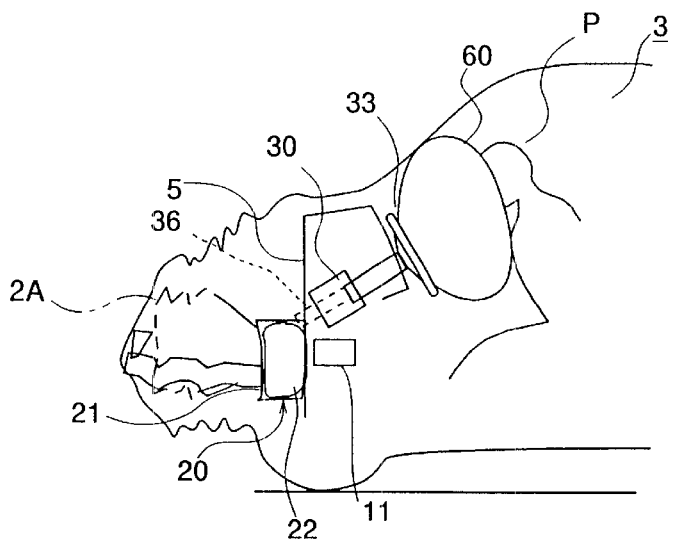
Figure 6A:
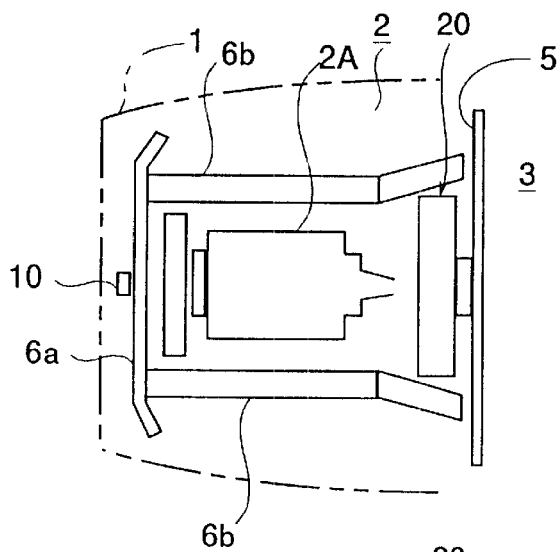
FIGS. 6a to 6c are schematic representations of the operational states shown in FIGS. 5a to 5c when viewed from the plane, respectively (1: body airbag).
Figure 6B:
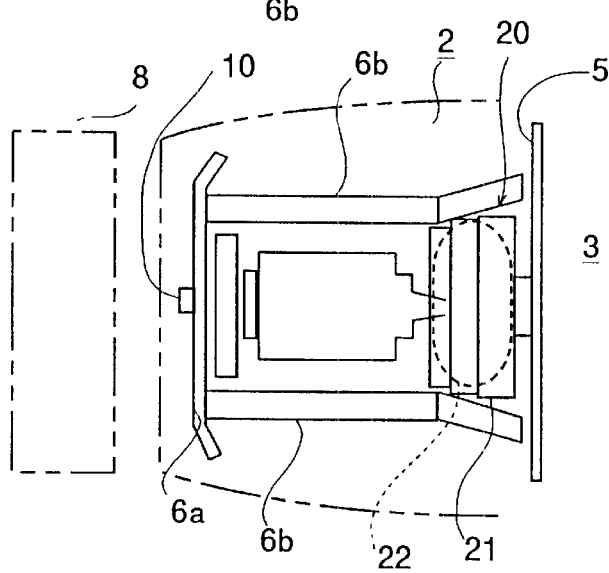
Figure 6C:
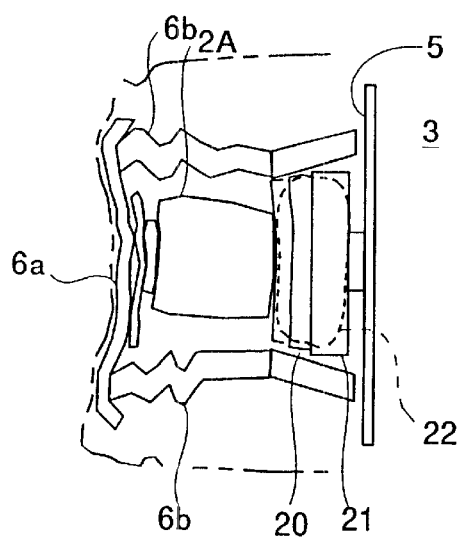

FIGS. 6a to 6c are schematic representations showing states corresponding to FIGS. 5a to 5c when viewed from the plane. As is shown in these drawings, at a fully overlapped serious head-on collision, a front cross member 6a and the right and left side members 6b connected thereto are largely deformed, so that the engine 2A and other equipped parts in the engine room 2 move rearward by following the deformation while, as shown in FIG. 6c, the body airbag 20 deploying in the front face of the partition wall 5 deforms so as to support these parts by receiving them to thereby absorb the collision energy to be transmitted to the cabin 3 by its deformation stroke.

Figure 3:
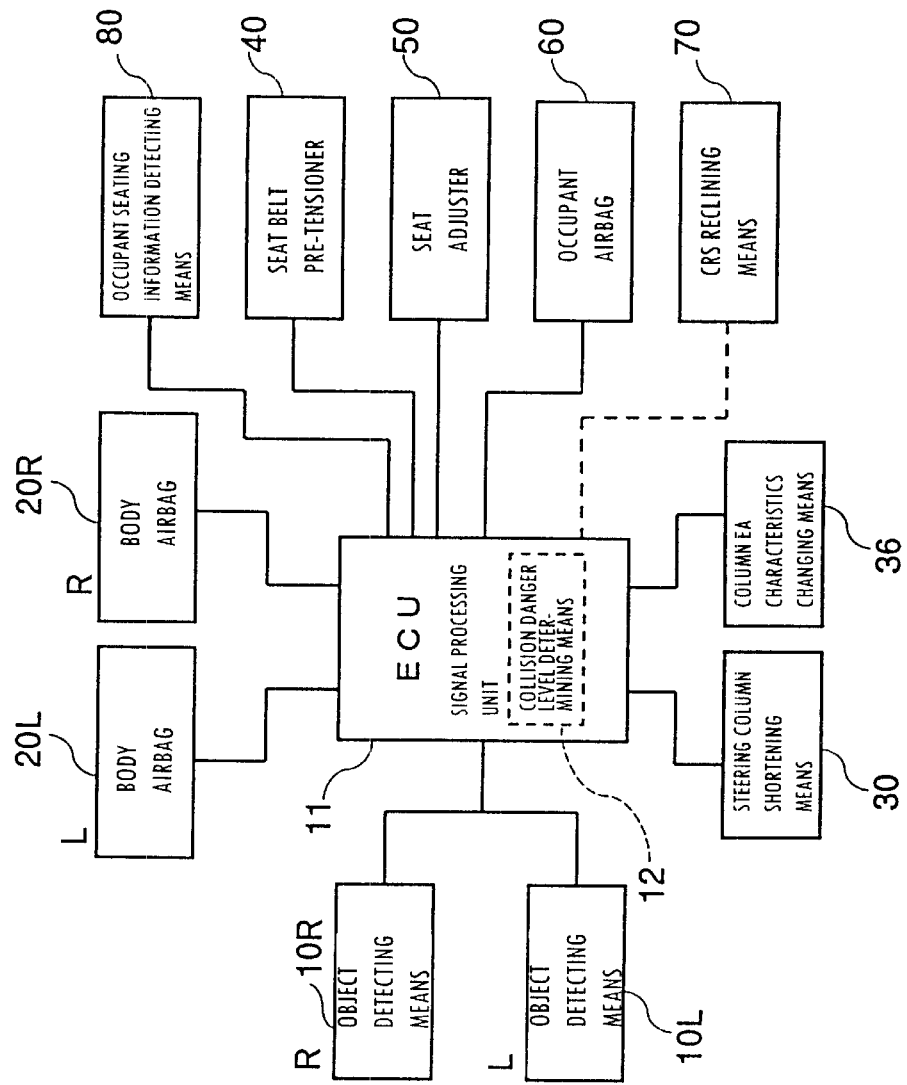
FIG. 3 is a block diagram showing a system structure having two body airbags in the vehicle collision damage reduction system shown in FIG. 1.
Figure 7A:
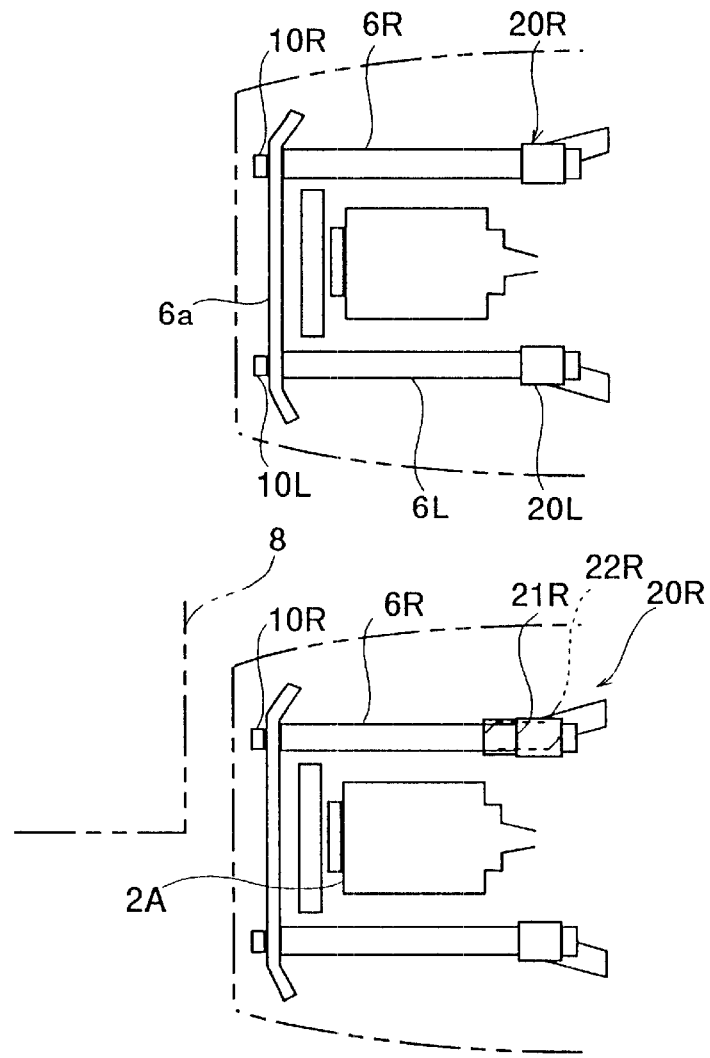
FIGS. 7a to 7c are schematic representations of the operational states shown in FIGS. 5a to 5c when viewed from the plane, respectively (2: body airbag).
Figure 7B:
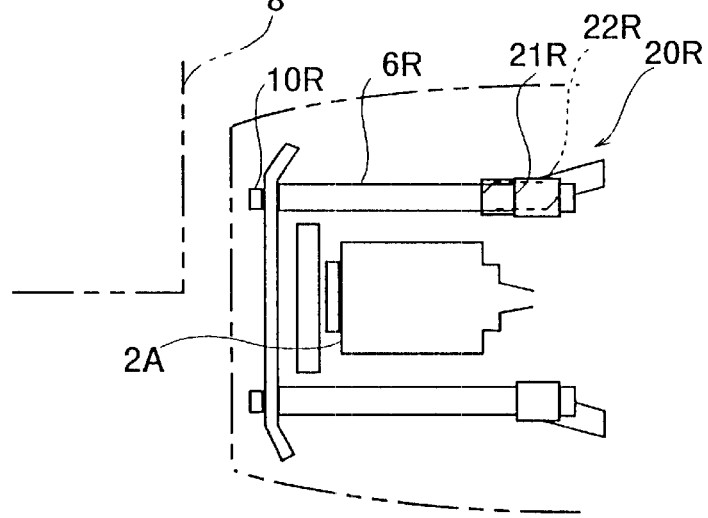
Figure 7C:
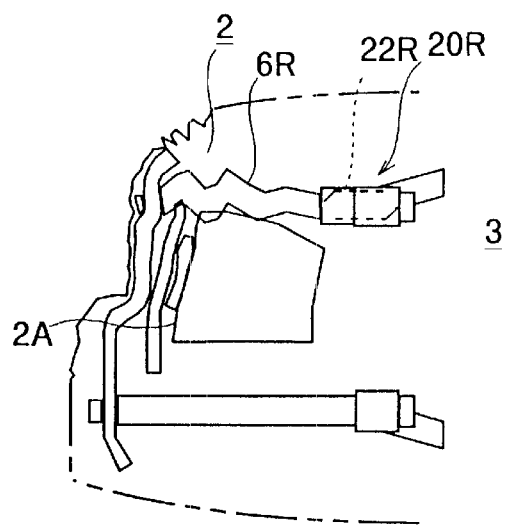

On the other hand, FIG. 3 is a block diagram showing the structures of side body airbags 20R and 20L independently assembled into side members 6R and 6L on the right and left (FIG. 6a), respectively. FIGS. 7a to 7c are schematic representations illustrating how the safety vehicle structure with the above elements works from the collision predicting until operation of the airbag and finally the collision. As is shown in FIG. 3 and FIGS. 7a to 7c, these side body airbags 20R and 20L can be independently operated in response to collision predicting sensors 10R and 10L arranged to the right and left of the vehicle 1 as the object detecting means 10. That is, as shown in FIG. 7b, upon an off-set collision, in which only the collision predicting sensor 10R, one of the collision predicting sensors, predicts the "emergency level", the side member 6R, which is the side to be impacted, will be greatly crushed so that the engine 2A and other equipped parts in the engine room 2 disposed to the right of the vehicle 1 are substantially deformed, whereas a bag 22 arranged in a case 21R of the body airbag 20R in the side member 6R side is inflated before the collision, as shown in FIGS. 7b and 7c. Thereby, the collision energy can be efficiently absorbed in the collision side. Also, the body airbag 20 shown in FIG. 6a is used together to thereby prevent the deformation from affecting on the cabin 3 side while energy absorbing capacity of the front of the vehicle 1 in a collision is increased to thereby reduce damage to a pedestrian in case of a collision to the pedestrian.

Occupant Collision Energy Absorbing Means: Steering Column Shortening Means, EA Load Characteristics Changing Means FIGS. 5a and 5b schematically show the steering column shortening means 30 assembled in the vehicle 1. In this embodiment, a known telescopic mechanism (not shown) introduced to a steering column 31 is used as the steering column shortening means 30. That is, the telescopic mechanism movable in a predetermined stroke of 50 to 100 mm is provided in the steering column 31. When a collision is predicted, an operational signal from the ECU 11 is received, thereby, the column is shortened by "Δc" in the axial direction "S" (see FIG. 5b) by driving a driving unit (explosives, a motor, and a spring, all not shown) and so forth with the telescopic mechanism unlocked. As the operational timing, the shortening starts at about 10 ms before the collision and finishes in about 20 ms. Thereby, the distance between an occupant (driver) and a steering wheel is increased so that force which the occupant receives in moving forward by the collision impact against the steering wheel can be reduced. In addition, as the steering column shortening means 30, the entire length of the column may also be shortened by bending an arm of a column link mechanism.

Figure 8A:
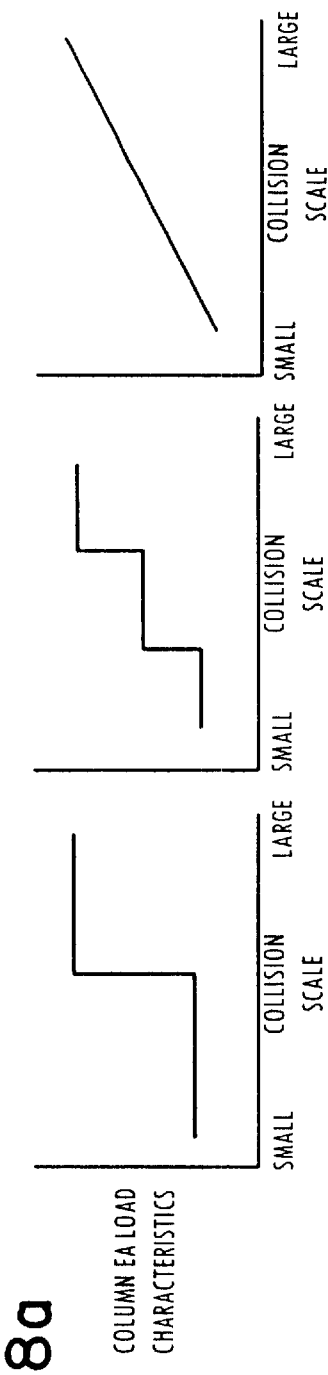
FIGS. 8a and 8b are charts of EA load characteristics set in a steering column.

A damage reduction technology has been conventionally known in that energy absorbing means is provided in the steering column 31 in case of an occupant "P" falling over the steering wheel 33 via the airbag in a collision (see FIG. 1). For example, the column is shortened in the axial direction by deforming a bellows, a steel mesh, or the like in the axial direction while maintaining the steering functions. In this embodiment, the EA load characteristics are changed on the basis of the collision scale and the danger level detected by the object detecting means 10 or the collision danger level determining means 12 and also on the basis of the occupant physique obtained from the occupant seating information detecting means 80. FIG. 8a shows an example of settings of characteristics in the column EA load characteristics means (not shown) corresponding to the collision scale (intensity of the collision) detected by an impact sensor such as an acceleration sensor. The load characteristics may be changed according to one or plural quantitative threshold values established, and the EA load characteristics may also be established in response to changes obtained by multiple times of detection.

Figure 8B:
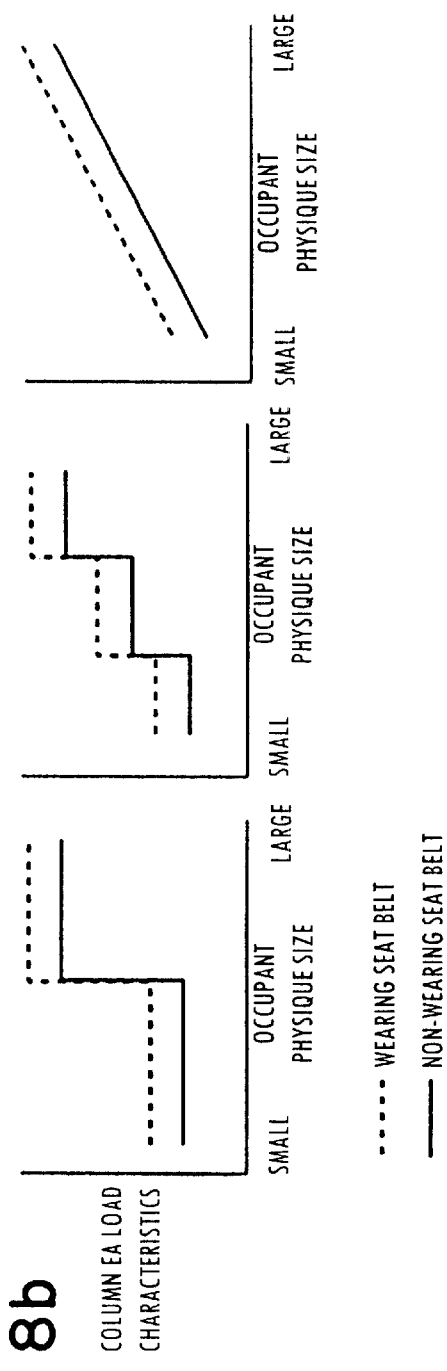

It is also preferable that the EA load characteristics be changed by the EA load characteristics changing means 36, which is the energy absorbing means, in consideration of the occupant physique. As the occupant seating information detecting means 80, the weight sensor 81, the seat-sliding sensor 82, an occupant position detecting sensor, a vision sensor (image picking up sensor), or the like is provided in a predetermined position in the seat 4 or the cabin 3. The information signal obtained from the sensor is output to the ECU 11 to be signal-processed therein. FIG. 8b shows an example of settings of characteristics of the column EA load characteristics corresponding to the occupant physique. The load characteristics are set according to one or plural threshold values established (for example, AF 05%, AM 50%, AM 95%). It is also preferable that, since the moving timing and the displacement of an occupant in a collision differ largely on whether the seat belt is fastened or not, the EA load characteristics can be set in response to each of these cases.

Seat Adjusting Mechanism

Figure 9:
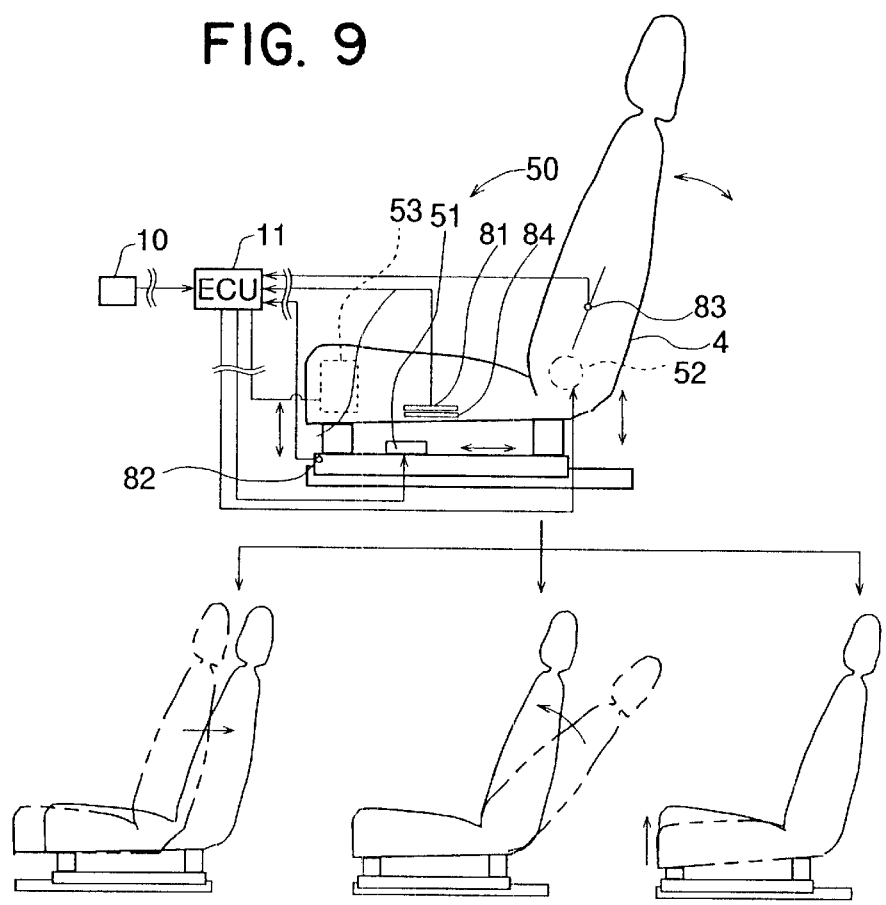
FIG. 9 is a representation of the schematic structure and the operational state of a seat adjusting mechanism.

FIG. 9 is a schematic system diagram showing the schematic structure of the seat adjusting mechanism 50, which performs an operation to correct the posture of each part of the seat during the predicting stage, and showing the relationship between sensors 81, 82, 83, and 84 as the occupant seating information detecting means 80 to achieve the posture corrective operation. In a power seat, there are conventionally provided a seat sliding mechanism 51, a seat back reclining mechanism 52, and a seat height adjusting mechanism 53, which are individually or simultaneously operable by an occupant via a concentrated remote switch. Furthermore, in each part of the seat, there are provided the weight sensor 81, the seat sliding sensor 82, the reclining angle detecting sensor 83, and the seat face inclination detecting sensor 84. Each detected signal is input to the ECU 11 as the occupant seating information. Accordingly, when the above-mentioned undesirable seating states are confirmed according to the occupant seating information, the following posture corrective operations are generally performed after obtaining a positive collision predict determination:

(1) Slide the seat to the rear end (or a predetermined intermediate position).

(2) Raise the reclined seat back to the upright position (at a predetermined angle).

(3) Tilt the seat face sloping down forward to be slightly slanted rearward.

The angular correction is performed by controlling and operating known driving mechanisms, such as a electrical motor, a gear mechanism driven by an oil pressure jack, a wiring mechanism via pulleys, and a link mechanism, by an operational signal from the ECU 11.

FIGS. 10a to 10c are control characteristic representations showing corrective operational amounts of various parts of the seat established according to the danger level determined by the collision danger level determining means 12 in the collision predicting stage. In the seat adjusting mechanism 50, the "emergency level" (when the relative velocity between an own vehicle and an object to be impacted is more than a predetermined speed, 10 to 20 km/h for example, while being collision-unavoidable by the driver's operation) is established as one threshold value. Furthermore, an intermediate setting position (angle), which is not such an emergency level, may be established as a second threshold value. A seat position, a reclining angle, inclination of the seat face, and so forth may also be sequentially changed on the basis of computation of the relative velocity and the relative distance obtained by multiple times of detection.

Seatbelt Pre-tensioner

Figure 11:
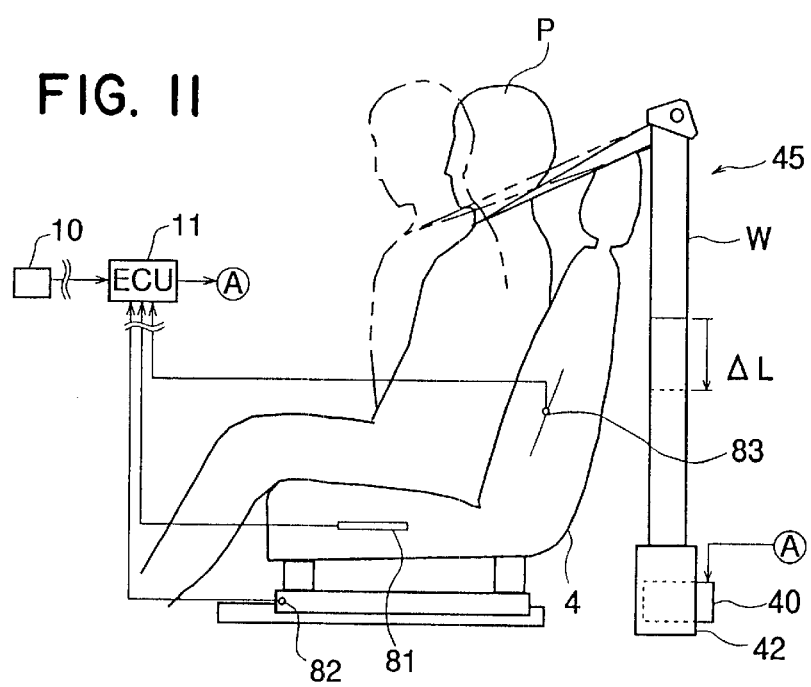
FIG. 11 is a representation of the schematic structure and the operational state of a seat belt pre-tensioner.

FIG. 11 is a schematic system diagram showing the seatbelt pre-tensioner 40, which performs the retracting operation of the webbing in the predicting stage of a collision, and shows the relationship between sensors 81, 82, and 83 as the occupant seating information detecting means for achieving the retracting operation. As shown in the drawing, the information of an occupant "P" being seated on the seat 4, the information of the occupant physique, the seat sliding position, and the reclining angle is obtained from the sensors 81, 82, and 83. These information signals are signal-processed by the ECU 11 so as to establish the optimum retracting length "ΔL" of the webbing "W" to thereby output an operational signal to the pre-tensioner 40 built in the seatbelt take-up device 42.

That is, when it is determined by a collision predicting sensor 10 that the relative speed between the object to be impacted 8 and the equipped vehicle is greater than a predetermined speed and a collision will probably occur within a short time, or when a danger level is determined by the collision danger level determining means 12, the seatbelt pre-tensioner 40 is operated to thereby remove slack of webbing, which is fitted to an occupant "P" before the collision, and further to apply a predetermined tension to the webbing in a collision. This seatbelt pre-tensioner 40 is operated by a smaller set output to retract webbing. Accordingly, when a collision occurs, a moving occupant can be efficiently restrained and protected.

In the pre-tensioner 40, it is preferable that a piston/cylinder be driven by using pressure fluid of a high-pressure source such as an explosive power of explosives or an accumulator into which gas is accumulated. Furthermore, a driving source such as an biasing mechanism using a spring and an electrical motor may be used. Any part of the webbing such as a shoulder-belt anchor portion, a slip-anchor adjuster portion, a waist-belt anchor portion, or a buckle may be available to have such a mechanism besides the belt take-up device. The above parts may have a such mechanism in combination. At the retracting time, it is preferable that the pre-tensioner 40 be capable of retracting a webbing length of about 200 mm.

As operational timing of the pre-tensioner 40, it is preferable that it be driven at a moment (between 5 ms before a collision and at the collision) when operation of the seat sliding mechanism 51 and the seat back reclining mechanism 52 in the seat adjusting mechanism 50 is finished and a belted occupant is positioned in a most rearward position which is the condition at which the webbing is drawn out the least.

CRS Reclining Mechanism

Figure 12A:
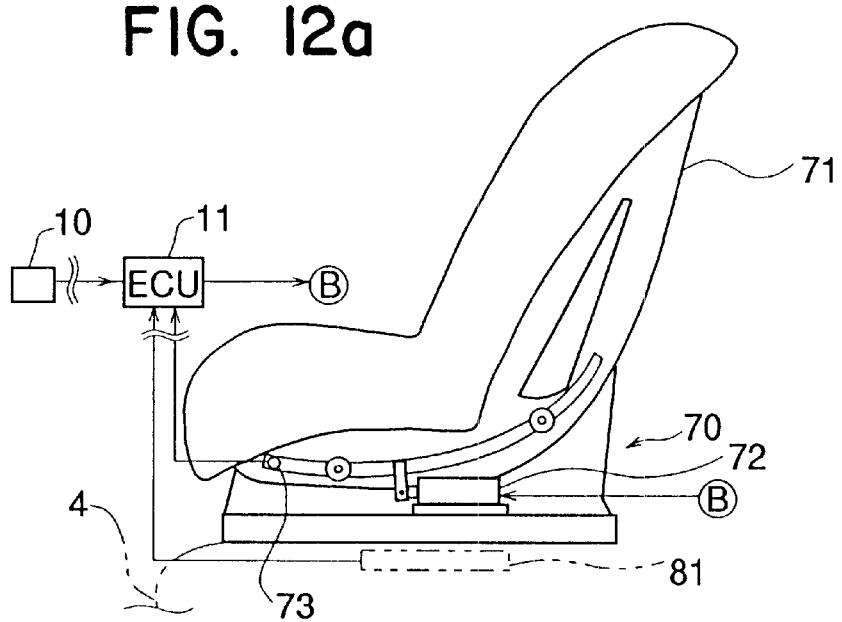
FIGS. 12a and 12b are representations of the schematic structure and the operational state of a child seat.

FIG. 12a is a schematic system diagram showing the reclining mechanism 70, in which corrective operation of the reclining angle of the CRS 71 installed to the seat 4 is performed in the collision predicting stage and it shows the relationship with the weight sensor 81 as the occupant seating information detecting means 80 for achieving the corrective operation. The installing direction of the CRS 71 and an infant seating state are detected by the weight sensor 81 within the seat face, and furthermore, reclining angle information can be obtained from a reclining angle sensor 73 within the CRS 71. The information is signal-processed in the ECU 11 so as to establish the correction angle "θ" of the reclining angle in the CRS 71 thereby outputting an operational signal to the reclining mechanism 70.

Figure 12B:
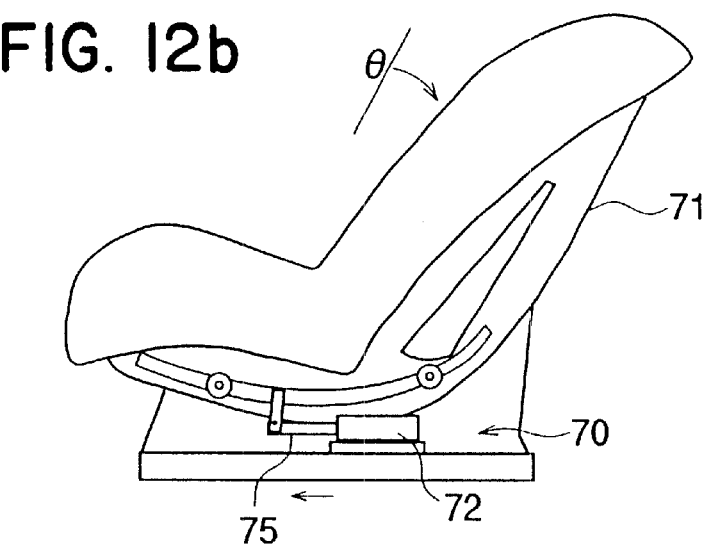

FIG. 12b shows an oil pressure piston/cylinder being used as the driving means 72 and is actuated by an operational signal from the ECU 11 so that the reclining angle of the CRS 71 is corrected. As shown in the drawing, the reclining angle can be established in stages by controlling the extending length of the piston/cylinder 75.

As the driving means 72 of the reclining mechanism 70, a known electrical motor is suitable along with the oil or air pressure piston/cylinder shown in FIG. 12a. As a reclining angle adjusting mechanism, it is preferable that a gear mechanism, a wiring mechanism via pulleys, a link mechanism and the like be introduced in the CRS 71. These parts are operated and controlled by an operational signal from the ECU 11.

The controlling state and control characteristics of the CRS when its reclining angle is corrected will be described with reference to FIGS. 13 to 15.

Figure 13A:
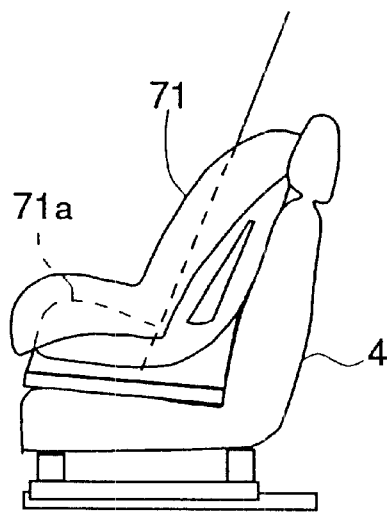
FIGS. 13a and 13b are schematic representations of the fixed state and the state of the corrective operation of the child seat.
Figure 13B:
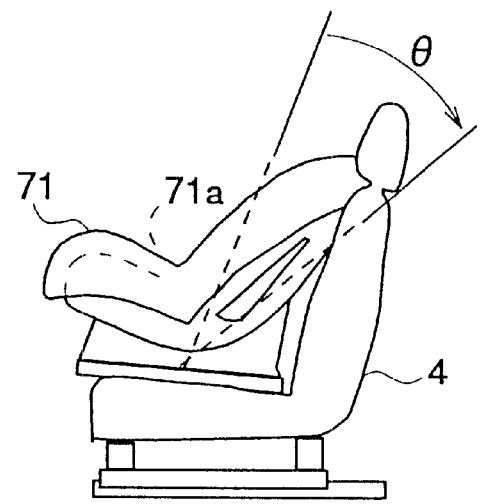

FIG. 13a shows the forward-facing CRS 71 in an upright position while FIG. 13b shows the CRS 71 reclined by the corrective operation of the reclining angle. By the correction, a seat face 71a inclined to the collision direction functions as a supporting surface so that part of the restraining load applied to the belt can be dispersed to the seat face 71a.

Figure 14A:
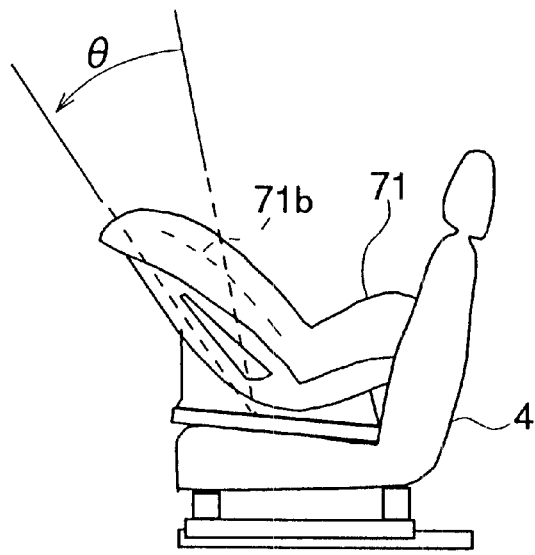
FIGS. 14a and 14b are schematic representations of the fixed state and the state of the corrective operation of the child seat.
Figure 14B:
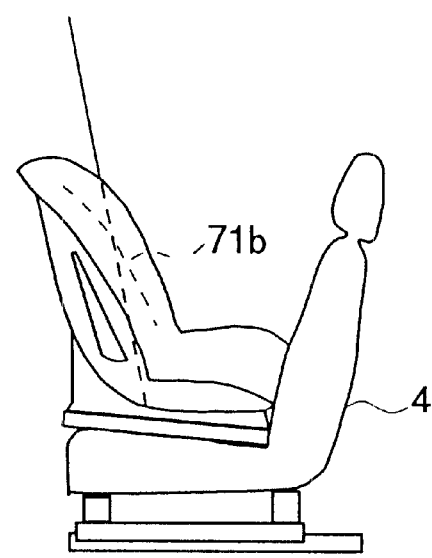

On the other hand, as shown in FIGS. 14a and 14b, when the CRS 71 is installed rearward-facing, the reclining angle is corrected (FIG. 14a) so that a seat back 71b of the CRS 71 rises to a substantial upright position (FIG. 14b) by the corrective operation of the reclining angle. By the correction, impact applied to an infant is dispersed to the seat back 71b.

Figure 15A:
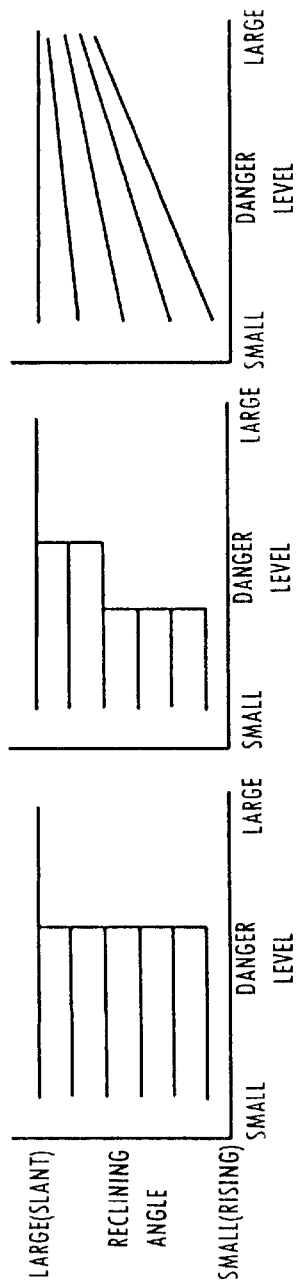
FIGS. 15a and 15b are characteristic charts of the corrective states set in the child seat.
Figure 15B:
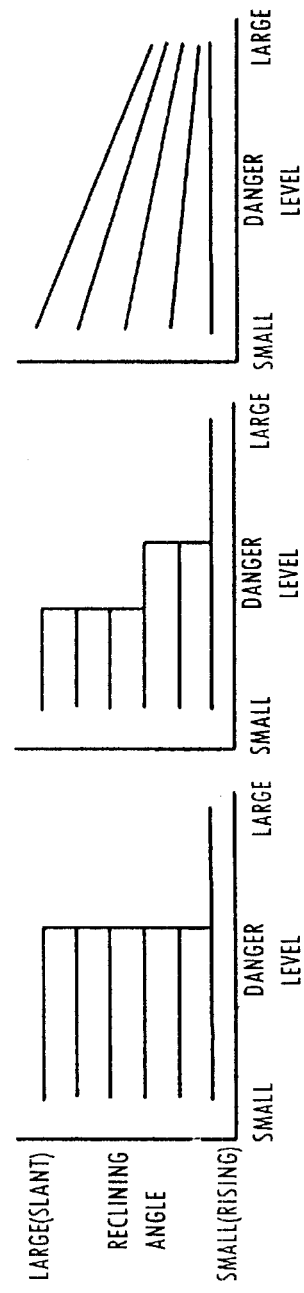

FIGS. 15a and 15b are control characteristic charts showing the correction amount of the reclining angle in the CRS 71 established according to the danger level. The danger level is determined by the collision danger level determining means 12 at the collision predicting stage according to the installing state of the CRS 71 (forward facing: FIG. 15a, rearward facing: FIG. 15b). In the reclining mechanism, the "emergency level" (for example, when the relative velocity between an own vehicle and an object to be impacted is more than a predetermined speed, 10 to 20 km/h for example, while being collision-unavoidable by driver's operation) is established as one threshold value. Furthermore, an intermediate setting position (angle), which is not such an emergency level, may be established as a second threshold value. The adjustment amount of the reclining angle may also be changed on the basis of computation of the relative velocity and the relative distance obtained by plural times of detection.

We claim:

1. A vehicle collision damage reduction system comprising:

an object detector for sequentially detecting distance information to an object to be impacted by the vehicle;

an electronic control unit for determining a collision danger level using the distance information and for outputting an operational command, before the collision, to activate a safety device in response to the collision danger level a seatbelt pre-tensioner for a seatbelt take-up device of a seat; and a seat adjusting mechanism capable of adjusting seat sliding, reclining, and seat height of a seat independently or simultaneously;

wherein the pre-tensioner operates after the seat adjustment mechanism has finished adjusting the seat.

2. The system of claim 1, wherein the object detector sequentially detects distance information to an object to be impacted moving relatively.

3. The system of claim 1, wherein an amount of webbing taken up by the seatbelt pre-tensioner is capable of being adjusted in predetermined amounts, before a collision, in response to the danger level of collision predicting information obtained from the electronic control unit.

4. The system of claim 1, further comprising an occupant seating information detecting means for detecting the physique and a seating state of an occupant seated in a seat and to provide this information to the electronic control unit and wherein a webbing retraction amount of the seatbelt pre-tensioner is established on the basis of the physique and the seating state information.

5. The system of claim 1, wherein the seat adjustment amount of the seat adjusting mechanism is changed in stages, before a collision, in response to the collision danger level.

6. The system of claim 1, further comprising an occupant seating information detecting means for detecting the physique and a seating state of an occupant seated in a seat and outputting the seating information to the electronic control unit, wherein the seat adjustment amount is established, before a collision, on the basis of the physique and seating state information.

7. The system of claim 1, wherein the safety device further comprises a means for absorbing collision energy in a vehicle structure formed to support part of the vehicle structure and absorbing collision energy applied thereto in a collision.

8. The system of claim 7, wherein the collision energy absorbing means comprises an airbag for at least a portion of the vehicle structure, the airbag being inflatable, before a collision, by an operational command from the electronic control unit and deforming so as to absorb collision energy applied thereto when the vehicle structure deforms at the collision.

9. The system of claim 8, wherein the expansion rate or the energy absorbing amount of the airbag is adjustable in response to the collision danger level.

10. The system of claim 8, wherein the airbag is positioned to absorb impact energy applied to the vehicle in a substantially head on collision.

11. The system of claim 8, wherein the expansion rate or the energy absorbing amount of the airbag for the vehicle structure is changed in stages in response to the collision danger level of the collision predicting information obtained from the electronic control unit.

12. The system of claim 8, wherein the airbag is positioned in a case that also absorbs a part of the collision energy.

13. The system of claim 1, wherein the safety device further comprises a mechanism capable of shortening a steering column at least in part in its axial direction, so as to increase the distance between the occupant and the steering column or a shaft.

14. The system of claim 13, wherein the shortening mechanism is introduced as part of the steering column.

15. The system of claim 13, wherein load characteristics of the shortening mechanism are adjustable in stages in response to the collision danger level.

16. The system of claim 13, wherein the distance between the occupant and the steering shaft or a shaft is adjustable in stages in response to the collision danger level.

17. The system of claim 13, further comprising an occupant seating information detecting means for detecting physique and a seating state of an occupant, and wherein the length of the steering wheel column is established by the operational command on the basis of the physique and seating state information.

18. The system of claim 1, wherein the safety device further comprises a child seat installed on a seat and capable of being adjusted at different reclining angles.

19. The system of claim 18, wherein the adjustment amount of the reclining angle of the child seat is changed in stages, before a collision, in response to the collision danger level.

20. The system of claim 18, further comprising an occupant seating information detecting means for detecting the child seat placed on a seat and for outputting the seating information to the electronic control unit.

* * * * *